April 26, 1960

S. A. JONES 2,933,824

OVERHEAD SOLIDS WITHDRAWAL MEANS FOR
FLUIDIZED SOLIDS CONTACTING VESSELS

Filed May 14, 1956

INVENTOR.
SAM A. JONES

BY
Harry B. Keck
ATTORNEY

April 26, 1960

S. A. JONES 2,933,824

OVERHEAD SOLIDS WITHDRAWAL MEANS FOR
FLUIDIZED SOLIDS CONTACTING VESSELS

Filed May 14, 1956

INVENTOR.
SAM A. JONES

BY

*Harry B. Keck*
ATTORNEY

United States Patent Office 2,933,824
Patented Apr. 26, 1960

2,933,824

OVERHEAD SOLIDS WITHDRAWAL MEANS FOR FLUIDIZED SOLIDS CONTACTING VESSELS

Sam A. Jones, Pittsburgh, Pa., assignor to Consolidation Coal Company, a corporation of Pennsylvania Application May 14, 1956, Serial No. 584,591

3 Claims. (Cl. 34—57)

The present invention relates to gas-solids contacting systems employing the fluidized solids technique. More specifically, it relates to apparatus for overhead withdrawal of solids from a fluidized solids contacting vessel.

Many treating operations requiring intimate contacting of finely divided solids with vapors are conducted according to the fluidized solids contacting technique whereby a bed of finely divided solid particles is established within a containing vessel having a gas inlet at its bottom for introduction of the vapors whose intimate contact with the solid particles is desired.

The vapors pass upwardly through the bed of solid particles at a velocity selected so that a single liquid-like phase of solids and vapors is maintained. Under these conditions, the bed expands from its settled volume to occupy a greater volume of the confining vessel. The density of the bed is correspondingly reduced. Each individual particle within the bed becomes free to move in response to the upward force component of the rising vapors. Usually the vapor velocity is selected so that there is only a slight tendency for the vapors to entrain solid particles, thereby carrying them in suspension out of the dense phase. Frequently, however, it is desired to operate the fluidized solids contacting system under conditions whereby the solid particles from the bed are removed continuously in gaseous suspension with the fluidizing gases which have passed through the bed.

An example of a fluidizing contacting system employing overhead solids withdrawal is a fluidized coal heater in which finely divided particles of coal are maintained under fluidized conditions by passing hot gases upwardly therethrough as a fluidizing medium. Hot gases entrain particles of coal and carry them in suspension out from the vessel through a discharge conduit having an opening near the top of the heating vessel.

I have found that the "slugging" phenomenon manifested in fluidized solids contacting systems induces plugging of conventional overhead withdrawal ports. "Slugging" has been defined as a condition in which pockets or bubbles of fluidizing vapor grow to the diameter of the containing vessel and the mass of particles trapped between adjacent vapor pockets moves upwardly within the vessel in a piston-like fashion. The upward movement of piston-like slugs of finely divided solids engulfs the conventional overhead discharge ports with dense concentrations of solids. The continuing flow of fluidizing gases is obstructed and pressure surges result within the vessel. The dense concentrations of finely divided particles may cause permanent obstructions within the restricted outlet port.

The pressure surging within the first vessel of a series of sequential fluidized solids processing vessels introduces severe slugging conditions within subsequent vessels. In processes provided with vessels in series for sequential fluidized solids treatments, solids are entrained in gases and passed as a suspension to the subsequent vessels. Any pressure surging in the discharge conduit will tend to induce slugging of the fluidized solids beds of the subsequent vessels.

According to the present invention, plugging of solids in the vapor withdrawal means can be avoided for any one fluidized solids processing vessel by providing as the discharge means a perforated conduit extending downwardly within the vessel substantially through that portion of the vessel which is occupied by the expansion of the solids resulting from fluidization. The perforations in the conduit should be many fold larger than the finely divided solid particles comprising the fluidized solids contacting bed. The cumulative area of the perforations should comprise only a minor portion of the total area of the conduit means.

In a fluidized solids contacting vessel equipped with perforated discharge conduit means according to this invention, the tendency of bed slugging to induce plugging in the withdrawal conduit is avoided. The surges of gas pressure normally resulting when piston-like slugs of fluidized solids move upwardly to the top of the confining vessel can be dissipated instantaneously by passage of the pocket of gas through the perforations of the depending perforated conduit means directly into the withdrawal means. Thus all of the solids and gases withdrawn overhead from the fluidized solids contacting vessel pass first through the perforations provided in the conduit means for discharge from the system therethrough.

In addition to avoiding the plugging tendency inherent in slugging beds having overhead withdrawal means, the apparatus of the present invention also serves to reduce somewhat the slugging tendencies of such beds. The pockets of rising vapors which create and support the piston-like slugs of solids can be dissipated into the perforated conduit means, thereby by-passing the supported slug of solids, removing the gas support thereunder, and resulting in the collapse of the particles comprising the piston-like slug downwardly into the main body of the fluidized bed once more.

For a thorough understanding of the present invention, its objects and advantages, reference should be had to the following description and accompanying drawings in which.

Figure 6:
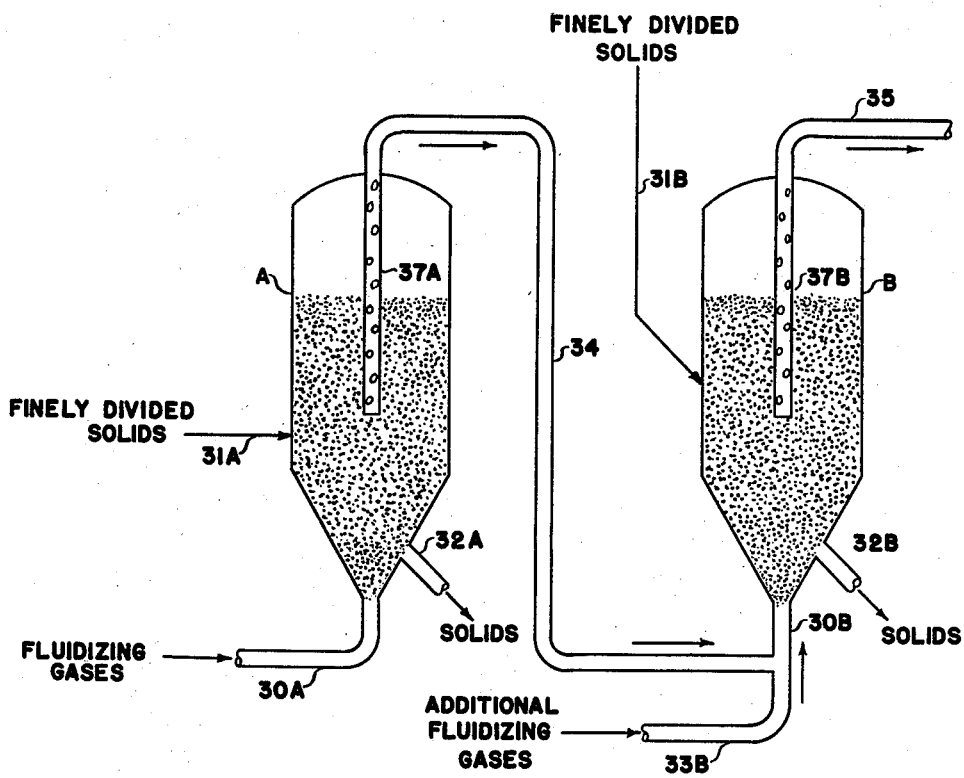
Figure 7:
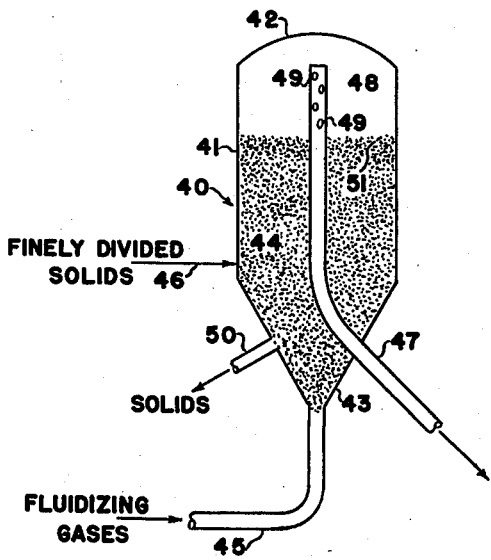

Figure 6 is an illustration of a series of fluidized solids vessels through which solid particles receive sequential treatment demonstrating the improved results obtainable by the present invention; and Figure 7 is a cross-sectional view of a fluidized solids contacting vessel employing an alternative embodiment of the present invention wherein the holids withdrawal means associated with the top of the vessel extend downwardly to permit gravity flow of solids and gases therefrom.

Figure 1:
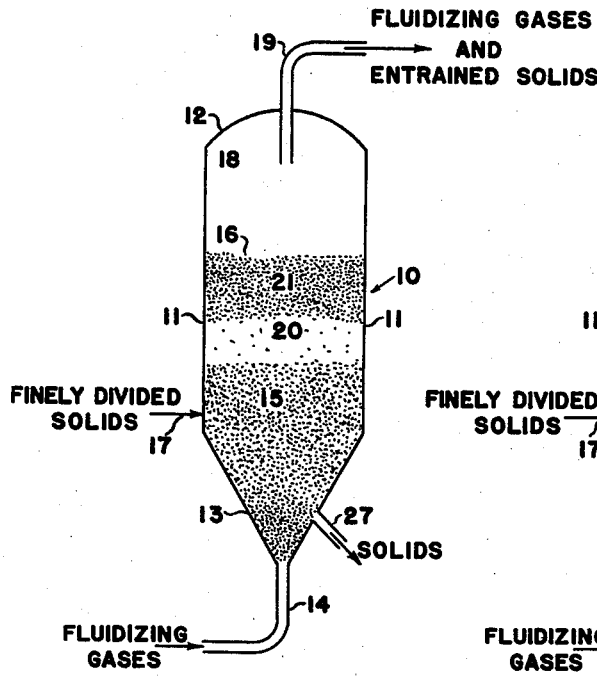
Figure 1 is a cross-sectional view of a fluidized solids contacting vessel having overhead withdrawal means associated with the top of the vessel for removing gases and finely divided solids therefrom.

Referring to Figure 1, a fluidized solids contacting vessel 10 is illustrated having side walls 11, a top wall 12, and a bottom wall 13. A vapor inlet conduit 14 is provided in the bottom wall 13 for the introduction of fluidizing gases. A bed of finely divided, fluidizable solid particles 15 is confined within the vessel 10. The bed 15, when subjected to fluidized conditions, has an upper level 16 which may fluctuate in height when the bed 15 is maintained under conditions of serious slugging. Finely divided solids are introduced into the bed 15 in any convenient manner, indicated generally by the arrow 17. If desired, the finely divided solids may be entrained in the vapor entering the vessel 10 through the conduit 14.

Fluidizing vapors passing upwardly through the vessel 10 maintain the bed of solid particles 15 in a turbulent, fluidized state. Under these conditions the solids of the bed 15 are expanded in volume from the volume they would occupy as a settled bed. Fluidizing gases rise beyond the upper level 16 into a disengaging space 18 in the top portion of the vessel 10. Solid particles, entrained in the fluidizing gases in the disengaging space, pass through a withdrawal conduit 19 which extends through the top wall 12 and is in open communication with the disengaging space 18.

Under normal operating conditions, solids will be removed through the conduit 19 at the same rate that additional solids are introduced into the vessel 10 by the solids introduction means 17. The upper level 16 of the bed will attain an equilibrium height to effect this result. If desired, a solids withdrawal conduit 27 may be provided near the bottom of the vessel 10 to remove a portion of the solids of the bed 15.

Under non-slugging conditions, the conventional apparatus illustrated in Figure 1 performs satisfactorily. To understand the nature of the problem to which the present invention is directed, a brief discussion of the mechanism of the slug formation is helpful.

Solid particles in the fluidized bed 15 are separated from each other by the vapor flowing upwardly through the bed so that the vapors and solids assume properties like those of the true liquid. The upwardly flowing gas phase passes through the liquid-like bed in the form of bubbles just as a gas phase passes upwardly through a true liquid. During their ascent through the bed, these bubbles coalesce in the same manner as do gas bubbles passing upwardly through a true liquid. In fluidized reaction vessels (particularly those having large length/diameter ratios) the coalesced bubbles increase in size to the diameter of the vessel and thereupon tend to move the entire overhead bridged portion of the bed of solids upwardly in the manner of a piston. The "piston" of fluidized solids tends to drag along the walls of the vessel and hence will eventually disintegrate through its internal shearing stresses, allowing the slug of vapor to pass upwardly until another portion of overhead solids becomes bridged above the large bubble to form another "piston." When the slug of vapor reaches the upper level of fluidized bed, it bursts through the surface in an explosive manner causing solid particles to be propelled well above the bed. This explosive action at the surface of the bed increases the quantity of solids suspended in the vapor above the bed, thereby creating a dense particle concentration in the disengaging space.

Figure 2:
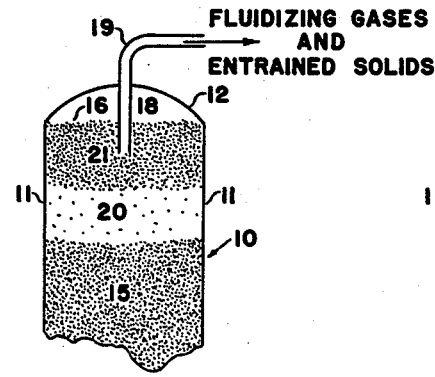
Figure 2 is a cross-sectional view of the upper portion of the fluidized solids contacting vessel shown in Figure 1 indicating the conditions prevailing in the upper portions of the vessel under circumstances of extreme slugging.

In Figure 1, a coalesced bubble of vapor 20 is illustrated as supporting a piston-like slug 21 of fluidized solids. As the slug of vapor 20 rises within the vessel 10, the piston-like slug of fluidized solids 21 is forced upwardly until the conditions illustrated in Figure 2 are manifested. As shown in Figure 2, the upper level 16 of the fluidized bed has been raised during slugging into proximity of the top wall 12. The piston-like slug 21 of fluidized solids engulfs the opening of the withdrawal conduit 19 creating a plug which obstructs the passage of vapor therethrough. As a result of the continuing flow of fluidizing gases into the vessel 10 through the conduit 14, the gas pressure existing in the vapor pocket 20 surges to an increased value which has two consequences:

First, the upward force component of the vapor is reduced, thereby eliminating the vapor support for the slug of solids 21 which thereupon disintegrates.

Second, the pressure surge within the vessel 10 creates a tendency to compact the solids from the slug 21 within the relatively restricted withdrawal conduit 19. The compacting may result in permanent plugging of the overhead withdrawal conduit 19 which necessitates the termination of processing within the vessel 10. The plugging problem is particularly acute where the finely divided solids are agglomerative materials such as coal undergoing thermal treatment within the vessel 10. Since thermal treatment of coal particles is frequently carried out with relatively coarse particles, the slugging properties of such fluidized coal contacting systems are appreciable.

Figure 3:
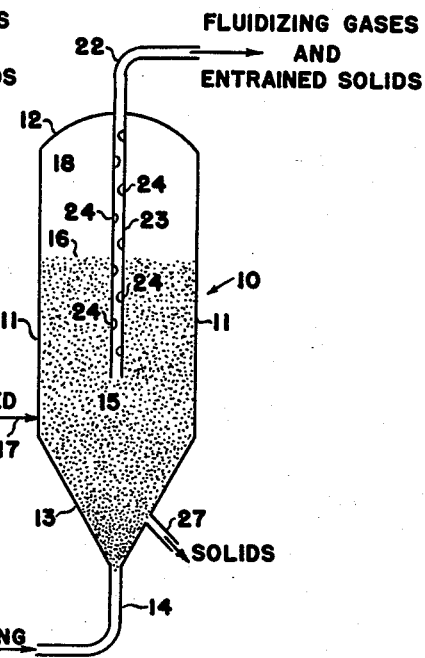
Figure 3 is a cross-sectional view of a fluidized solids contacting vessel employing apparatus according to the present invention.

Apparatus according to the present invention is illustrated in Figure 3 which avoids the plugging tendency induced by slugging fluidized beds. Numerals 10 to 18 inclusive and numeral 27 in Figure 3 identify the corresponding elements which are described in connection with Figure 1. Withdrawal means 22 comprises a conduit 23 which (as depicted) extends through the top wall 12 of the vessel 10 and depends through the disengaging space 18 and substantially through that portion of the vessel 10 occupied by the expanded volume of the bed 15 resulting from fluidization. That portion of the conduit 23 depending into the vessel 10 contains a plurality of vertically spaced perforations 24, each having a cross-sectional area many fold larger than that of the finely divided solids comprising the bed 15. The cumulative area of the perforations 24 is minor in comparison to the cumulative area of the conduit 23.

Figure 4:
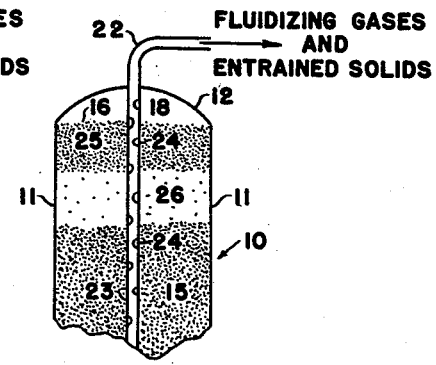
Figure 4 is a cross-sectional view of the upper portion of the vessel shown in Figure 3 indicating the conditions prevailing therein under circumstances of extreme slugging corresponding to the showing of Figure 2.

Under non-slugging conditions, fluidizing gases pass into the disengaging space 18 and travel through the perforations 24 in to the conduit 23 along with entrained solid particles. When severe slugging conditions are imposed, as shown in Figure 4, a slug of solid particles 25 may rise to the top of the vessel 10 supported by vapor pocket 26 formed from a coalesced bubble of fluidizing gases. The conditions illustrated in Figure 4 correspond to those illustrated in Figure 2. Under the severe slugging conditions illustrated in Figure 4, elevation of the slug of solid particles 25 into proximity of the top wall 12 does not introduce potential plugging conditions in the withdrawal means 22. The gases in the vapor pocket 26 do not experience any increase in pressure since the gases are free to enter the openings 24 of the depending conduit 23 rather than exert a compacting stress on the elevated solids contained in the slug 25. Gases thus entering the conduit 23 from the vapor pocket 26 will carry entrained solids therethrough to the overhead withdrawal means 22.

An additional advantage to the present invention is that slugging tendencies may be somewhat reduced by means of the apparatus. Any vapor pockets formed within the vessel 10 will tend to elevate a slug of fluidized solids but also will tend to be self-dissipating through release of some of the gases into the conduit 23 through the perforations 24 even if the vapor pocket be formed in the lower portions of the bed 15. However the present invention is not intended to eliminate slugging within the vessel to which it is applied although the slugging tendency therein will be somewhat reduced. The purpose of the present invention is to prevent the consequential deleterious plugging of overhead withdrawal means 22 which occurs in slugging beds.

Channeling of fluidizing gases through the depending perforated discharge conduit has not been observed.

The exact configuration of the perforations 24 within the conduit 23 is immaterial. The openings may be drilled, punched, sawed or provided in any convenient manner. They may be geometrical aligned or randomly positioned.

Figure 5:
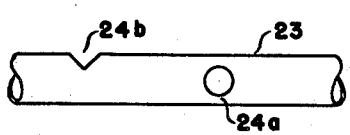
Figure 5 is an illustration of conduit means adapted for use in the present invention showing typical perforations.

Figure 5 illustrates a section of conduit 23 showing two types of perforations which I have found to be satisfactory. The perforation 24a can be provided by drilling a hole through the wall of the conduit 23. Perforation 24b can be provided by sawing a notch through the wall of the conduit 23.

For a specific illustration of the present invention, a fluidized bed of finely divided coal was established in a vertical cylindrical vessel having an inner diameter of six inches and an overall height of sixty inches. The vessel was equipped with a conical bottom having a conduit at its apex for introducing air as a fluidizing gas. The top wall of the vessel was a horizontal flange having an aperture at its geometric center. A three-quarter-inch diameter standard pipe was fitted above the top horizontal flange in communication with the aperture to provide a discharge conduit for gases and solids leaving the vessel through the aperture.

A three-quarter-inch diameter standard pipe, thirty-six inches long, was mounted axially within the vessel communicating with the top wall aperture. The pipe contained four holes, each three-eighths inch in diameter, located one-inch from the top horizontal flange. At six-inch intervals down the pipe, two holes, each three-eighths-inch in diameter were provided. Thus the pipe contained fourteen holes, each three-eighths-inch in diameter. The bottom end of the pipe was open and was located in the central portion of the vessel.

The finely divided coal comprising the solids bed was capable of passing through a 14 mesh Tyler Standard Screen. About 20 percent of the coal particles were capable of passing through a 200 mesh Tyler Standard Screen. The height of the settled bed of coal particles was about 20 inches. Fluidizing gas velocity was varied from 0.5 to 1.5 feet per second. Under these conditions the bed of fluidized solids exhibited severe slugging.

The absolute pressure in the discharge conduit leading away from the vessel indicated that only insignificant pressure surging occurred. Visual inspection of a transparent tubular insert section within the discharge conduit indicated that a solids-in-gas suspension of relatively uniform composition was removed from the fluidizing vessel.

Referring to Figure 6, a typical fluidized solids processing system is illustrated for treating finely divided solids sequentially through a series of fluidized solids contacting vessels. Two treating vessels, A and B, are illustrated in Figure 6.

Each of the vessels A and B has gas inlet means 30A and 30B at the bottom for introduction of fluidizing gases. Solids introduction means 31A and 31B may be provided for each of the fluidized processing vessels A and B. If desired, the finely divided solids entering vessel A may be introduced as a suspension in the fluidizing gases which are introduced through the conduit 30A. Each of the vessels A and B may be provided with a solids removal conduit 32A and 32B for removing a portion of the solids from the fluidized bed within the processing vessel. Conduit 33B may be provided for introducing additional fluidizing gases for the subsequent fluidizing processing if desired.

Fluidizing gases and finely divided solids from the vessel A are withdrawn through an overhead discharge conduit 34 and introduced as a gas-in-solids suspension into the reaction vessel B. Fluidizing gases and finely divided solids may be removed from the reaction vessel B through the overhead withdrawal conduit 35 and be subjected to further treatment as a solids-in-gas suspension. Alternatively, solids separation means may be provided to prevent finely divided solids from leaving the vessel B and all of the processed solids may be withdrawn through the solids removal conduit 32B; fluidizing gases, free of solids, would be removed through conduit 35.

A perforated conduit 37A is provided within the vessel A and a perforated conduit 37B may be provided within the vessel B. The perforated conduits 37A and 37B correspond to the perforated conduit 23 illustrated in Figure 3.

In the operation of the system shown in Figure 6, finely divided solids are processed under fluidizing conditions in the vessel A and then transported to the vessel B as a solids-in-gas suspension through conduit 34 for further processing under fluidizing conditions. In a system of this character, the fluidizing gases entering the system through the conduit 30A must be under sufficient pressure to support fluidized beds of solids in the vessels A, B and any additional fluidized treatment vessels in series with the vessels A and B.

Severe slugging conditions in the vessel A would have a tendency to produce plugging in the conduit 34 between the vessels A and B with concomitant pressure surging in the conduit 34. The surging pressures transmitted through the conduit 34 into the vessel B would correspond to the slugging in the vessel A and would magnify slugging tendencies in the vessel B. The magnified slugging in the vessel B would result in magnified pressure surging in the conduit 35. Any additional processing vessels in series with the vessels A and B would experience slugging conditions of increased severity.

However, where the series processing system illustrated in Figure 6 is provided with perforated conduit 37A according to the present invention, serious slugging in the vessel A does not produce pressure surging in the conduit 34 and accordingly the flow of fluidizing gases into the vessel B through the conduit 37B relatively uniform. Thus the fluidized bed within the vessel B is not subjected to magnified slugging tendencies which would result from pulsating pressures of the fluidizing gases provided through the conduit 30B. Where a solids-in-gas suspension is to be removed from the vessel B for further treatment in additional vessels in series, the conduit 37B will smooth the flow of suspension through the remainder of the system. The conduit 37B is unnecessary where solids from vessel B are removed principally through the bottom withdrawal means 32B and fluidizing gases are separately removed through the overhead conduit 35.

An alternative embodiment of the principles of the present invention is illustrated in Figure 7. In Figure 7 a fluidized solids processing vessel 40 is provided with vertical side walls 41, a top wall 42 and a conical bottom wall 43. Within the fluidized solids processing vessel 40, a bed 44 of finely divided solids is maintained under fluidized conditions by up-flowing fluidizing gases which enter the vessel 40 through a conduit 45 which communicates with the conical bottom wall 43 at its apex. Finely divided solids are introduced into the vessel 40 by any convenient means, indicated schematically by the arrow 46. If desired, the finely divided solids may be suspended into fluidizing gases and introduced as a suspension through the conduit 45. A solids discharge conduit 47 is provided for removing finely divided solids and spent fluidizing gases from the vessel 40. The conduit 47 extends through the bottom wall 43 and vertically upwardly through the fluidized bed 44 into a disengaging space 48 near the top wall 42. The upper end of the conduit 47 is open and a plurality of perforations 49, as previously described, are provided through the conduit 47 near its open upper end. If desired, a solids removal conduit 50 may be provided through the bottom wall 43 for removing a portion of the solid particles comprising the bed 44.

Fluidizing gases passing through the conduit 45 enter the vessel 40 and serve to maintain fluidized conditions in the bed 44. Gases and entrained solids pass through the bed 44 into the disengaging space 48 and depart from the system downwardly through the conduit 47. In the event severe slugging conditions are maintained within the vessel 40, the perforations 49 will serve to prevent plugging of the discharge conduit 47.

In this embodiment of the invention, the upper level 51 of the bed 44 is determined by the position of the lowermost perforation 49 of the solids withdrawal conduit 47.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a fluidized solids processing system having at least two fluidized solids processing vessels assembled in series for sequential treatment of solids in a dense fluidized bed with fluidizing gases in a first vessel and subsequent treatment of said solids in a dense fluidized bed with the same fluidizing gases in a second vessel, said first vessel having fluidizing gas inlet means and solids inlet means, said second vessel having an effluent gas outlet means and treated solids outlet means, said system having means for transferring solids and fluidizing gases from said first vessel to said second vessel, the improvement in said last-mentioned means comprising conduit means extending through a wall of said first vessel and extending substantially through that portion of said first vessel occupied by the expanded volume of fluidized solids, said conduit means having a plurality of vertically spaced perforations extending therethrough over that portion of said conduit means extending within said first vessel, said perforations being many fold larger than said solids and comprising in cumulative area only a minor portion of the cumulative area of the portion of said conduit means within said first vessel, and further conduit means communicating with the first-mentioned conduit means and extending from said first vessel through the wall of said second vessel below the dense fluidized bed therein contained.

2. In a fluidized solids processing system having at least two fluidized solids processing vessels assembled in series for sequential treatment of solids in a dense fluidized bed with fluidizing gases in a first vessel and subsequent treatment of said solids in a dense fluidized bed with the same fluidizing gases in a second vessel, said first vessel having fluidizing gas inlet means and solids inlet means, said second vessel having an effluent gas outlet means and treated solids outlet means, said system having means for transferring solids and fluidizing gases from said first vessel to said second vessel, the improvement in said last-mentioned means comprising conduit means extending upwardly through an aperture in a wall of said first vessel below the upper surface of the dense phase fluidized bed therein contained and extending substantially through that portion of said first vessel occupied by the expanded volume of fluidized solids, said conduit means having a plurality of vertically spaced perforations extending therethrough over that portion of said conduit means extending within said first vessel, said perforations being many fold larger than said solids and comprising in cumulative area only a minor portion of the cumulative area of the portion of said conduit means within said first vessel, and further conduit means communicating with the first-mentioned conduit means and extending from said first vessel through the wall of said second vessel below the dense fluidized bed therein contained.

3. In a fluidized solids processing system having at least two fluidized solids processing vessels assembled in series for sequential treatment of solids in a dense fluidized bed with fluidizing gases in a first vessel and subsequent treatment of said solids in a dense fluidized bed with the same fluidizing gases in a second vessel, said first vessel having fluidizing gas inlet means and solids inlet means, said second vessel having an effluent gas outlet means and treated solids outlet means, said system having means for transferring solids and fluidizing gases from said first vessel to said second vessel, the improvement in said last-mentioned means comprising conduit means extending downwardly through an aperture in a wall of said first vessel above the upper surface of the dense phase fluidized bed therein contained and extending substantially through that portion of said first vessel occupied by the expanded volume of fluidized solids, said conduit means having a plurality of vertically spaced perforations extending therethrough over that portion of said conduit means extending within said first vessel, said perforations being many fold larger than said solids and comprising in cumulative area only a minor portion of the cumulative area of the portion of said conduit means within said first vessel, and further conduit means communicating with the first-mentioned conduit means and extending from said first vessel through the wall of said second vessel below the dense fluidized bed therein contained.

References Cited in the file of this patent

UNITED STATES PATENTS

| | | |
|---|---|---|
| 1,912,910 | Neuman et al. | June 6, 1933 |
| 2,488,031 | Gunness | Nov. 15, 1949 |
| 2,631,089 | Palmer | Mar. 10, 1953 |